Nov. 27, 1945.　　M. F. CHUBB ET AL　　2,389,893
DRYING FORMED BATTERY PLATES
Filed Dec. 3, 1943
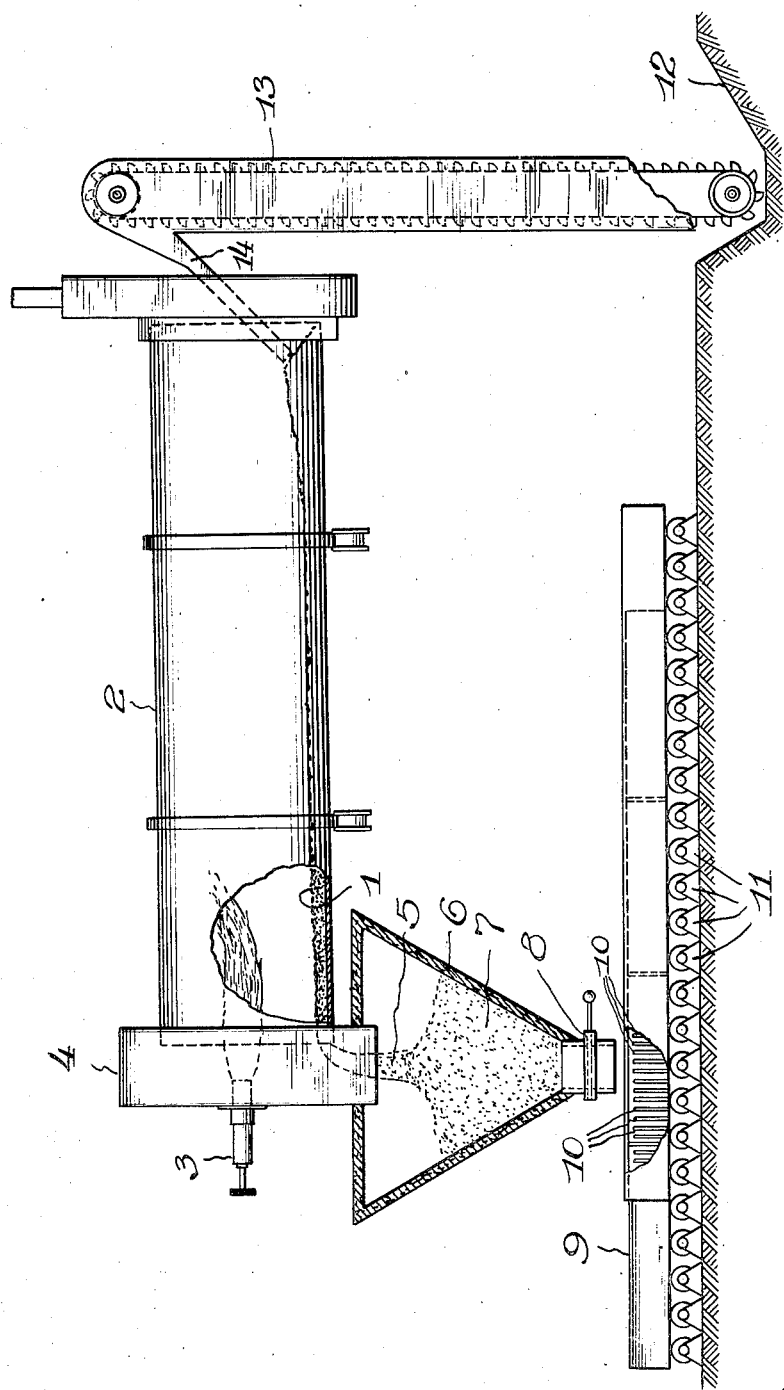
INVENTORS.
Melvin F. Chubb
Percy F. Ebert
BY Wood, Arey, Herron & Evans
Attorneys.

Patented Nov. 27, 1945

2,389,893

UNITED STATES PATENT OFFICE 2,389,893

DRYING FORMED BATTERY PLATES

Melvin F. Chubb and Percy F. Ebert, Joplin, Mo., assignors to The Eagle-Picher Company, a corporation of Ohio Application December 3, 1943, Serial No. 512,737

3 Claims. (Cl. 136—33)

Our invention relates to a method of drying storage battery plates of the lead acid type which have previously been formed either as the positive or negative plate.

Dry charged batteries of the lead-acid type are preferred for ocean shipment, the absence of the acid eliminating one of the hazards involved. They are also desirable for shipment to and use in remote parts of the world where charging facilities are not available as the dry charged batteries may be stored indefinitely without depreciation and are thereafter put into service by merely filling them with the proper strength and amount of dilute sulphuric acid.

The most difficult step in the preparation of dry charged batteries is the drying of the charged, or formed negative plate. The active material of the formed negative plate consists of spongy metallic lead in an extremely fine state of subdivision. In drying the plate, the primary concern is to prevent the oxidation of this finely divided lead, as any lead oxide produced in drying reacts with the sulphuric acid when the battery is filled, reducing the potential capacity of the battery.

In our studies of methods for drying plates of the lead acid storage battery type, we have discovered a simple, low cost, easily controlled method and apparatus that retains a very high percentage of the original plate capacity. Military specifications are based on plates heretofore available, and require a retained capacity of 50%. At the normal 6-hour or 20-hour testing rates, our plates have consistently retained over 70% of their original capacity and in many cases have retained 90% to 95%.

Our invention applies only to plates for batteries of the lead-acid type wherein the charged, or formed, positive plates consist largely of lead peroxide with some residual lead monoxide and lead sulphate, and wherein the charged or formed negative plates consist largely of very finely divided spongy metallic lead together with minor percentages of residual lead monoxide and lead sulphate together with colloidal or inert materials added to secure special performance features.

The plates for our invention may be prepared from any suitable lead materials, processed in any conventional manner prior to formation, and formed, or given their initial charge, in any of the process variations so well-known in the art. All we require of the plates is that they be fully formed so as to have developed capacity suitable for the application in the lead-acid type storage battery.

In carrying out experiments for the drying of storage battery plates of the lead-acid type, it occurred to us that plates of this type might be successfully dried with the use of hot sand and results have shown that when so dried we are enabled to produce plates free from shrinkage, cracks, or checks, and which retained a high percentage of their original capacity.

As a result of our experiments we have found the storage battery plates of the lead-acid type may be successfully dried with the use of sand by the control of the amount of sand and the quantity thereof so that immediately after pouring the sand around the plates the temperature thereof is not high enough to melt the framework of the plate or grid. We prefer an initial temperature of 375° F. to 400° F. After 10 minutes the temperature of the sand levels off well above 212° F. and preferably around 250° F. so the plates will dry completely. We have achieved good results using a sand screened to size that will flow freely and remain in intimate contact with the plates and yet not fine enough to stick to the wet plates on initial contact. By way of example, we have found that +10 mesh —20 mesh sand gives good results. The average drying time for plates is approximately 15 minutes.

The layer of sand first contacting the plates loses its heat quickly to the wet, cold plate, producing a moisture-saturated atmosphere in the interstices of the sand immediately surrounding the plates, but does not heat up the surface of the plates enough to cause drying or shrinkage. Thereafter the heat from the bulk of the sand moves slowly into the plates, gradually heating them to the preferred leveling off temperature of around 250° F., whereupon all moisture in the plates is converted to steam, which escapes into and through the interstices of the sand, driving out the air originally present, preventing oxidation of the plates and allowing them to dry without shrinkage and with high maintenance of capacity. Because of its low thermal conductivity sand is difficult to heat to the temperature required except in thin layers exposed to the source of heat, whether a flame, a heated surface, or other means of conveying heat.

One means of carrying out our invention is exemplified in the schematic drawing. The sand is heated in a thin layer 1 in a rotary kiln 2 by a direct flame from burner 3 in firing hood 4. The heated sand trickles continuously in a thin stream 5 into thermally insulated storage hopper 6. The hot sand 7 is held in the hopper until needed, being released through draw-off gate 8. The drying boxes 9 are narrow and long, of such a size as to accommodate groups of plates, or racks of single plates 10 and of a height to allow less than ½" of sand above the plates. These plate boxes are preferably moved under the sand hopper 6 on a roller conveyor 11 which should be long enough to allow 15 minutes time between filling with sand and dumping the sand into receiving pit 12 from which the sand is elevated through elevator 13 and returned to the kiln through spout 14.

In carrying out our process it is essential that the charged plates be washed substantially free of retained dilute sulphuric acid from the forming bath before drying if the high retained capacity we have obtained is to result. Reasonably good results have been obtained with unwashed plates, but the positive plates, especially, suffer marked capacity loss if they are not washed thoroughly.

The fully charged or formed plates are unmeshed, and immersed in water. They may be handled as single plates, racks of plates or as groups of plates, whichever is most convenient. Preferably, for convenience in handling, plates not burned into finished groups are placed in racks, the individual plates spaced ⅛" to ½" apart for efficiency in washing and also to allow the proper amount of hot sand to be poured between plates. Plates burned into finished groups are automatically spaced far enough apart to meet these requirements.

When sufficiently washed, the racks of wet plates or the plate groups are removed from the washing tanks, set into the drying boxes and the boxes quickly filled with sand heated to the desired temperature; usually 650° F. to 800° F., depending on the size and thickness of the plates and the plate spacing used. A typical table of sand temperatures during a drying run are as follows:

| Time, Min. | Sand temp., °F. |
|---|---|
| 0 | 700 |
| Sand poured between and over the plates | |
| 1 | 385 |
| 2 | 312 |
| 3 | 282 |
| 5 | 255 |
| 7 | 247 |
| 9 | 246 |
| 11 | 248 |
| 12 | 250 |
| 14 | 254 |
| 15 | 256 |

The average drying time is about 15 minutes, and it will be noted that there is a slight rise in temperature during the last five minutes. Our theory is that this indicates that all the moisture in the plates has been converted to steam, and that the rise is due to the arrival of the plate-sand mass at temperature equilibrium. After the temperature has risen for about five minutes, the sand is poured off and the plates removed to air, whereupon the steam held in the plate pores escapes at once and the plates are dry.

Having described our invention, we claim:

1. The method of treating formed storage battery plates of the lead-acid type which comprises surrounding the wet storage battery plates with heated sand which is substantially hotter han the boiling point of water at ordinary pressures and maintaining them in contact with the sand until the water originally present in the plates has been completely vaporized and removing the dried plates from contact with the sand.

2. The method of treating formed storage battery plates of the lead-acid type which comprises washing the retained sulphuric acid from the formed plate, surrounding the wet storage battery plate with heated sand which is substantially hotter than the boiling point of water at ordinary pressures and maintaining them in contact with the sand until the water originally present in the plates has been completely vaporized and removing the dried plates from contact with the sand.

3. In the step-by-step process of treating formed storage battery plates of the lead-acid type, the step of surrounding the wet storage battery plates with heated sand which is initially at a temperature ranging between 375° F. to 400° F.

MELVIN F. CHUBB.
PERCY F. EBERT.